(12) United States Patent
Vauchel et al.

(10) Patent No.: US 9,169,805 B2
(45) Date of Patent: Oct. 27, 2015

(54) THRUST INVERTER WITH TRANSLATABLE CASCADE VANES HAVING DETACHABLE FRONT FRAME

(75) Inventors: Guy Bernard Vauchel, Harfleur (FR); Pierre Caruel, Le Havre (FR); Andre Baillard, Bretteville du Grand Caux (FR); Peter Sagat, Le Havre (FR)

(73) Assignee: AIRCELLE, Gonfreville L'Orcher (FR)

( * ) Notice: Subject to any disclaimer, the term of this patent is extended or adjusted under 35 U.S.C. 154(b) by 625 days.

(21) Appl. No.: 13/510,352

(22) PCT Filed: Oct. 26, 2010

(86) PCT No.: PCT/FR2010/052286
§ 371 (c)(1),
(2), (4) Date: May 17, 2012

(87) PCT Pub. No.: WO2011/064479
PCT Pub. Date: Jun. 3, 2011

(65) Prior Publication Data
US 2012/0217320 A1       Aug. 30, 2012

(30) Foreign Application Priority Data

Nov. 18, 2009   (FR) ..................................... 09 05535

(51) Int. Cl.
*F01D 25/28* (2006.01)
*B64D 29/08* (2006.01)
(Continued)

(52) U.S. Cl.
CPC . *F02K 1/72* (2013.01); *B64D 29/08* (2013.01); *F01D 25/243* (2013.01); *F01D 25/28* (2013.01);
(Continued)

(58) Field of Classification Search
CPC ....... F01D 25/24; F01D 25/243; F01D 25/28; B64D 29/06; B64D 29/08; F05D 2250/34; F02C 7/20; F02K 1/54; F02K 1/64; F02K 1/68; F02K 1/72

USPC .......................... 60/226.2, 226.3; 244/110 B
See application file for complete search history.

(56) References Cited

U.S. PATENT DOCUMENTS 3,779,010 A * 12/1973 Chamay et al. ............... 60/226.2
3,831,376 A *  8/1974 Moorehead .................. 60/226.2
(Continued)

FOREIGN PATENT DOCUMENTS

EP       0 845 581 A1   6/1998
EP        0853192 A1   7/1998
(Continued)

OTHER PUBLICATIONS

International Search Report issued Mar. 1, 2011 by European Patent Office re: PCT/FR2010/052286; pp. 6; citing: FR 2 911 372 A1, F 2 930 762 A1, U.S. Pat. No. 7,484,356 B1 and EP 0 853 192 A1.

*Primary Examiner* — Phutthiwat Wongwian
*Assistant Examiner* — Rene Ford
(74) *Attorney, Agent, or Firm* — Brinks Gilson & Lione

(57) ABSTRACT

A thrust inverter for a turbojet engine nacelle includes an outer movable cowl and a front frame. The outer movable cowl translates between a closed position and a thrust inversion position and also moves to a supporting position in which the outer movable cowl is hinged and guided by a guiding member located on a pylon. In particular, the front frame holding cascade vanes is mounted downstream from an air blower housing, and part of the front frame is detachably connected to the air blower housing. The front frame is translatable along the guiding member once the front frame is detached from the air blower housing.

10 Claims, 3 Drawing Sheets

(51) Int. Cl.
*F02K 1/72* (2006.01)
*F02K 1/68* (2006.01)
*F02K 1/54* (2006.01)
*F01D 25/24* (2006.01)
*F02K 1/64* (2006.01)
*F02C 7/20* (2006.01)
*B64D 29/06* (2006.01)

(52) U.S. Cl.
CPC ............... *B64D 29/06* (2013.01); *F01D 25/24* (2013.01); *F02C 7/20* (2013.01); *F02K 1/54* (2013.01); *F02K 1/64* (2013.01); *F02K 1/68* (2013.01); *F05D 2250/34* (2013.01)

(56) References Cited

U.S. PATENT DOCUMENTS

| | | | |
|---|---|---|---|
| 6,170,253 B1 * | 1/2001 | Newton | 60/226.2 |
| 7,484,356 B1 | 2/2009 | Lair | |
| 2004/0159091 A1 | 8/2004 | Sternberger et al. | |

FOREIGN PATENT DOCUMENTS

| | | |
|---|---|---|
| FR | 2911372 A1 | 7/2008 |
| FR | 2930762 A1 | 11/2009 |
| RU | 2 237 184 C2 | 9/2004 |

* cited by examiner

THRUST INVERTER WITH TRANSLATABLE CASCADE VANES HAVING DETACHABLE FRONT FRAME

TECHNICAL FIELD

The present invention relates to a grid thrust inverting structure for a turbojet engine nacelle.

BRIEF DISCUSSION OF RELATED ART

An airplane is moved by several turbojet engines each housed in a nacelle also housing a set of related actuating devices related to its operation and performing various functions when the turbojet engine is operating or stopped. These related actuating devices in particular comprise a mechanical thrust inverter actuating system.

A nacelle generally has a tubular structure comprising an air intake upstream of the turbojet engine, a middle section intended to surround an air blower of the turbojet engine, a downstream section integrating thrust inversion means and intended to surround the combustion chamber of the turbojet engine, and generally ends with a jet nozzle whereof the outlet is situated downstream of the turbojet engine.

Modern nacelles are intended to house a dual flow turbojet engine capable of generating, via the rotating air blower blades, a hot air flow (primary flow) and a cold air flow (secondary flow) that circulates outside the turbojet engine through an annular passage, also called a tunnel, formed between a fairing of the turbojet engine and an inner wall of the nacelle. The two flows of air are discharged from the turbojet engine through the rear of the nacelle.

The role of a thrust inverter is, during the landing of an airplane, to improve the braking capacity thereof by reorienting at least part of the thrust generated by the turbojet engine forward. In that phase, the inverter obstructs at least part of the tunnel of the cold flow and orients that flow toward the front of the nacelle, thereby generating a counter-thrust that is added to the braking of the wheels of the airplane.

The means implemented to perform this reorientation of the cold flow vary depending on the type of inverter.

A common thrust inverter structure comprises a cowling in which an opening is formed intended for the deviated flow which, in a direct thrust situation of the gases, is closed by a sliding cowl and which, in a thrust inversion situation, is freed by translating the sliding cowl in the downstream direction (in reference to the flow direction of the gases), using cylinders for moving the sliding cowl, said moving cylinders being mounted on a frame of the cowling upstream of the opening.

The sliding cowl is most often formed from two half-cowls, with a substantially semi-cylindrical shape, which are hinged to the upper portion (at 12:00) on hinges parallel to the direction of translation of the sliding cowl, and which are closed by bolts in the lower portion (at 6:00).

This arrangement makes it possible, for maintenance operations, to access the inside of the nacelle, and in particular the turbojet engine or an inner structure of the inverter by opening said half-cowls.

In order to resolve certain problems related to a "butterfly" opening, a translational opening solution has been developed and is in particular described in application FR 2 911 372.

In any case, this nacelle structure housing the thrust inverter device undergoes axial aerodynamic forces during flight moving the structure back relative to the engine.

In order not to transmit these forces only onto the fastening points for fastening the inverter structure to the mast, an upstream portion of the inverter structure, called front frame, is connected to the structure of the turbojet engine, and more specifically to the air blower housing. The connection is traditionally done by a blade/groove system, as for example described in document EP 0 845 581, the male blade portion generally being supported by the front frame while the female groove portion is borne by the air blower housing.

Another possible thrust inverter structure comprises an outer assembly in a single piece without a break in the lower portion. Such a structure is called an O structure.

Such a structure is described in document FR 2 911 372, for example.

In an O structure, the outer structure is separated from the inner structure surrounding the engine and is translated in the downstream direction, beyond a thrust inverter withdrawal position in which it simply frees the inverter grids, so as to allow access to the engine body.

Whatever maintenance access mode is chosen, a C structure or an O structure, the cascade vanes still limit the access to the core of the nacelle. It is therefore necessary to retract them if one wishes to provide free access to the core of the nacelle.

To that end, certain technological embodiments are known that are based on the disassembly of the vanes to access the cowl surrounding the engine body. Then, certain parts of the cowl are disassembled so as finally to be able to access the engine body.

Such operations are lengthy, difficult, and involve risks of incorrect reassembly of elements undergoing usage forces, such as the vanes or access panels of the engine body, for example.

Reference may in particular be made to document US 2004/0159091, describing a set of vanes mounted so as to form an arc of circle ending with sliding rails. Such a solution makes it possible to facilitate the initial placement of the vanes before attachment to the front frame. However, during maintenance operations, access to the attachment means to the frame remains difficult and the removal of the vanes remains delicate, and the risk of incorrect reassembly of the vanes cannot be completely ruled out.

BRIEF SUMMARY

The present invention aims to offset the aforementioned drawbacks, and to that end comprises a thrust inverter for a turbojet engine nacelle including at least one outer cowl that is movable between a closed position of the thrust inverter and a thrust inversion position, said movable cowl also being able to be opened into a supporting position towards which said movable cowl is hinged and guided through the use of a guide means that is suitable to said movable cowl and located substantially on a pylon, to which the nacelle is intended to be attached, and at least one front frame capable of being mounted downstream from an air blower housing for said turbojet engine and directly or indirectly holds at least one flow diversion means, characterized in that over at least one section of the front frame, said front frame is detachably connected to the housing and is translatable along at least one related guiding member once said front frame is detached from the housing.

Thus, by providing a front frame detachably connected to the air blower housing and then translatable, the disassembly of the assembly is greatly facilitated. Furthermore, the front frame can be simply withdrawn to allow access to the concerned engine zone and put back into place just as simply, without requiring that the front frame and surrounding elements be completely taken out.

Completely taking out the front frame and the surrounding elements can then be limited to complete maintenance operations that require it.

Preferably, the entire front frame is detachably and translatably mounted.

Advantageously, the entire detachably mounted and movable front frame forms a single-unit assembly. Such a configuration is particularly intended for O structure nacelles, in which the outer structure can also be a sliding cowl.

According to one preferred alternative embodiment, the diversion means are cascade vanes.

Preferably, the front frame is mounted downstream of the housing by a male/female system of the blade/groove type. Such a connection allows an optimal mechanical connection while being easily disengageable with suitable means. Of course, any connecting means available to one skilled in the art and responding to the need for disengagement can be considered.

Advantageously, the front frame and the diversion means form, at least over one section, a single-unit assembly translatable when the front frame is detached from the housing.

Thus, the assembly formed by the front frame and the diversion means it supports can be translated in a single piece.

Advantageously, the associated guide members comprise a rail/guideway system.

Advantageously, the guide means have a larger play between them at a supporting position of the front frame relative to a functional play of the guide means at an active position of the front frame.

Preferably, at least part of the associated guide means is situated close to a connecting interface with a pylon to which the nacelle is intended to be attached. Thus, the transmission of the forces by the guide means at the mast is facilitated. It is also possible to provide at least one guide means opposite said connecting interface, or at the six o'clock zone for an underwing nacelle, and in particular for a C structure having a locking line in the six o'clock zone.

Also preferably, at least part of the associated guide means is intended to cooperate with the complementary guide means fixed directly or indirectly in said pylon.

Advantageously, at least part of the diversion means is detachable from the front frame and translatable independently therefrom. Thus, the diversion means can be moved independently of the front frame when the movement of the latter is not necessary.

Advantageously, the thrust inverter comprises an outer cowl translatably mounted along a substantially longitudinal axis of the nacelle, said movable cowl being equipped with temporary connecting means with the front frame and/or the diversion means, so as to translate the movable cowl, frame and/or diversion means assembly during a maintenance operation once the front frame and/or the diversion means have been detached from the housing.

Preferably, at least part of the movable elements, i.e. front frame, diversion means, and if applicable movable cowl, are associated with a centering and/or positioning means relative to another movable element, and/or a stationary structure of the thrust inverter.

BRIEF DESCRIPTION OF THE DRAWINGS

The present invention will be better understood upon reading the following detailed description in light of the appended drawing, in which.

DETAILED DESCRIPTION

In all of the figures, the invention has been illustrated as it is implemented on a grid inverter. The invention is of course applicable to other types of inverters having a front frame, but in particular using other diversion means such as blocking doors, for example.

Figure 1:
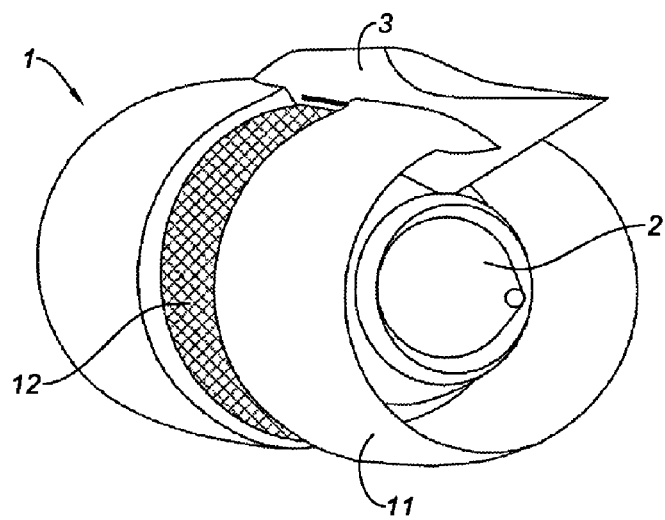
FIG. 1 is a general diagrammatic illustration of a turbojet engine nacelle comprising a downstream grid thrust inverter structure.

FIG. 1 is a general diagrammatic illustration of a turbojet engine 2 nacelle 1 suspended under a wing (not shown) via an island 3 intended to serve as an interface with a mast or pylon (not shown).

This nacelle 1 is traditionally subdivided into an upstream air intake section, a middle section surrounding an air blower (not visible) of the turbojet engine 2 and its housing, and a downstream section housing a thrust inverter device and possibly an end nozzle section.

The illustrated nacelle has a so-called "O" downstream section.

In FIG. 1, the thrust inverter device is shown in the deployed position, i.e. an outer cowl 11 of the downstream section is withdrawn in the downstream direction of the nacelle 1 so as to free an opening in the outer structure of the nacelle 1 and uncover cascade vanes 12 capable of reorienting part of the flow of air generated by the turbojet engine 2 toward the front of the nacelle 1 through the opening thus freed.

Figure 2:
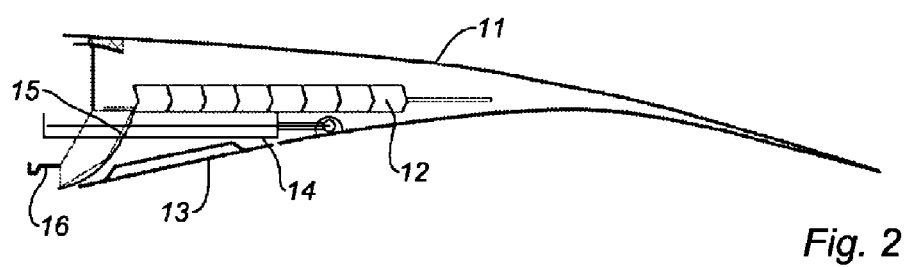
FIG. 2 is a diagrammatic cross-sectional view of the thrust inverter device equipping the nacelle of FIG. 1.

FIG. 2 shows a cross-sectional view of the downstream section in which the thrust inverter device is in the closed position.

In that case, the outer cowl 11 ensures the outer aerodynamic continuity of the nacelle with the upstream and middle sections and covers the cascade vanes 12.

Blocking flaps 13 ensure the inner aerodynamic continuity of the downstream section. When the thrust inverter device is activated, these flaps 13 pivot to at least partially cover a circulation tunnel of the flow of air and help its reorientation through the cascade vanes 12 and the opening freed in the outer structure of the nacelle 1.

The thrust inverter device is traditionally activated by at least one cylinder-type actuator 14 capable of translating the outer cowl 11.

The cascade vanes 12 are supported by a front frame 15 closing the thickness of the nacelle upstream of the outer cowl 11 and intended to be mechanically connected to the air blower housing via a fastening system 16, here of the blade/groove type, but other connecting systems can be considered.

According to the invention, the front frame 15 is equipped with detachable connecting means allowing it to be disengaged from the air blower housing and translated in the downstream direction so as to free access to the inside of the nacelle 1.

The detachable connecting means may be any known means, such as bolts, lock systems, etc.

Figure 3:
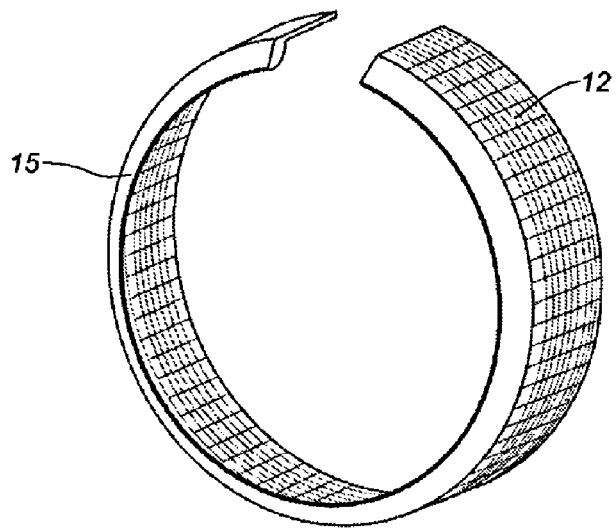
FIG. 3 is a diagrammatic illustration of a grid and front frame structure according to the invention equipping the thrust inverter device of FIG. 2.

Thus, as shown in FIG. 3, the front frame 15/cascade vane 12 assembly can then form a single-unit assembly, as shown for example in FIG. 3, movable into a supporting position.

FIG. 3 shows that the entire front frame 15 forms a movable strap. Of course, such a configuration may depend on the constitution of the nacelle, and in particular if the nacelle has a downstream "O" or "C" section.

The movable assembly may be a single piece or made from a plurality of structures rigidly connected to one another, in particular by bolting.

The movable assembly may also be subdivided into a plurality of independently translatable sections, or one or more sections fastened in locations not requiring any particular accessibility.

It will also be noted that the cascade vanes 12 can be secured to the front frame or detachably mounted and independently movable.

The guide means of the movable assembly will advantageously be situated near the interface 3 with the pylon, or the zone intended to receive the pylon in the event there is no particular interface 3.

Part of the guide means may be supported directly by the pylon or mast, or by the interface 3, like the guide means of the outer cowl 11.

Figure 4:
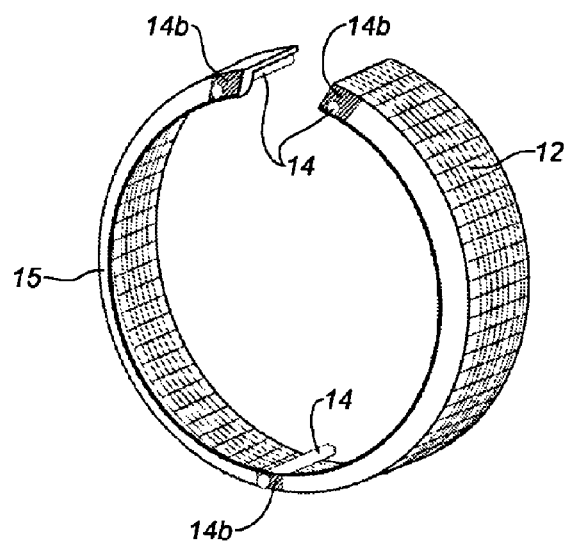
FIGS. 4 and 5 are alternative embodiments of the grid and front frame structure equipping a thrust inverter according to the invention.

As shown in FIG. 4, the assembly of the translatable front frame 15 may also comprise cylinders 14 for driving the outer movable cowl 11, these cylinders being supported by brackets 14b of the front frame 15. In the case at hand, there are three cylinders 14 for actuating the thrust inverter, i.e. two situated near the pylon and one in the zone situated opposite, but their arrangement will of course be adapted to the thrust inverter device used.

Figure 5:
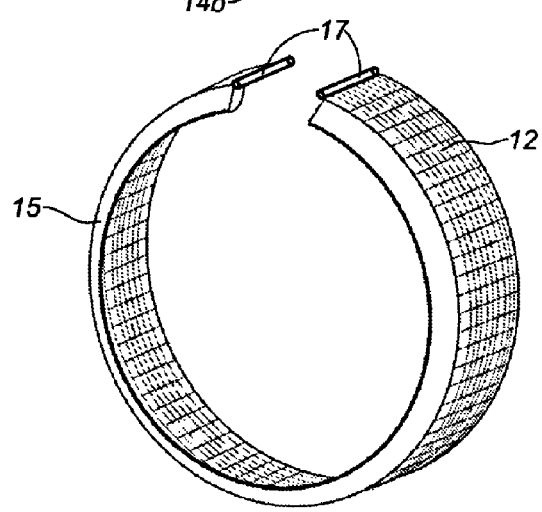

FIG. 5 shows an example of an embodiment and arrangement of the guide means. In the case at hand, the guide means for the front frame 15/cascade vane 12 assembly comprises a rail/guideway assembly 17, the guideways 17 being situated at the ends of the assembly and close to the interface 3 with the mast, or near the mast itself in the absence of an interface, the complementary guide means, i.e. the rails being secured in the mast, or the interface 3 with the mast.

The guideways 17 can be integrated into the grid structure 12 and/or front frame 15 or fastened thereon.

Of course, the arrangement can be inverted, i.e. the guideways 17 belong to the mast and the rails to the movable front frame structure 15.

However, fastening the guideways 17, and more particularly slides, on the front frame 15/vanes 12 movable structure allows a better orientation of the circumferential forces and their reaction and transmission to the mast.

Preferably, the section of the guideways 17 may be substantially semi-cylindrical so as to be able to allow a slight angular travel of the guideway in the event of deformation between the stationary structure to which the movable assembly is connected.

The guideways 17 can have various lengths. They can in particular extend over the entire length of the movable structure formed by the front frame, or only on part of that structure.

So that there is no interference between the upstream guiding (i.e. near the front frame 15) of the guideways 17 with the upstream fastener 16 on the air blower housing and no risk of hyperstaticity of the structure, an upstream part of the guideways 17 may be eliminated.

The distance without guideway 17 will depend on the relative flexibility of the structures and parasitic forces that may be borne by said structures, the forces undergone generally pivoting the vanes 12 downstream.

It is also advantageously possible to provide that the guide means have a wider play between them at a supporting position of the front frame relative to a functional play of the guide means at an active position of the front frame.

Thus, in the active position, i.e. when the front frame 15 is connected to the housing and may undergo aerodynamic forces opening the structure and pushing the downstream of said structure toward the outside, the rail/guideway connection 17 will advantageously be defined with minimum so-called functional play.

In the supporting position, i.e. when the front frame 15 is withdrawn in a position in which no aerodynamic force is likely to be exerted, the rail/guideway connection 17 will advantageously be defined with greater play, then facilitating the kinematics of the assembly and lightening the friction.

Furthermore, to go from the supporting (withdrawn) position to the active position without risk of interference between the components, and in particular the guide components, it is preferred to ensure end covering between the guideway 17 and the corresponding rail in the maintenance configuration. A length of twenty percent of the length of the guideway 17 will preferably be used.

As previously explained, in certain nacelle configurations 1, the outer cowl 11 can itself be translatable toward a supporting position. It may therefore be advantageous, during the transition to the supporting position, to connect the movable front frame structure 15 temporarily with the outer cowl 11 so as to translate both assemblies at the same time. The temporary connection of the two structures may advantageously be done via driving cylinders 14 of the outer cowl 11 that are supported by the front frame 15. Locked in the retracted position, these cylinders 14 can make up a mechanical driving connection of the two structures.

Additionally, and to avoid any risk of movement during the return to the active position of the moveable front frame element, it is possible to provide centering means.

Figure 6:
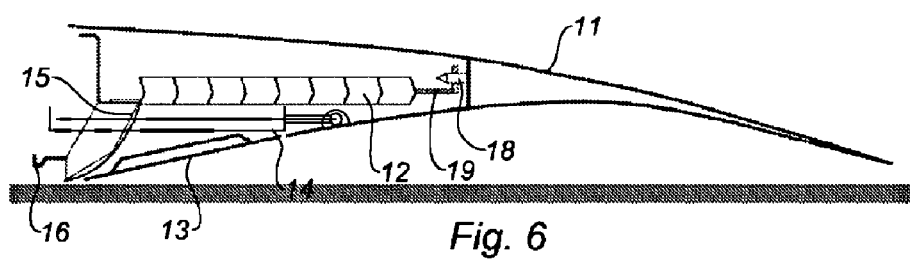
FIG. 6 is a diagrammatic view in longitudinal cross-section of a thrust inverter according to the invention and equipped with one of the means for centering translatable structures.
Figure 7:
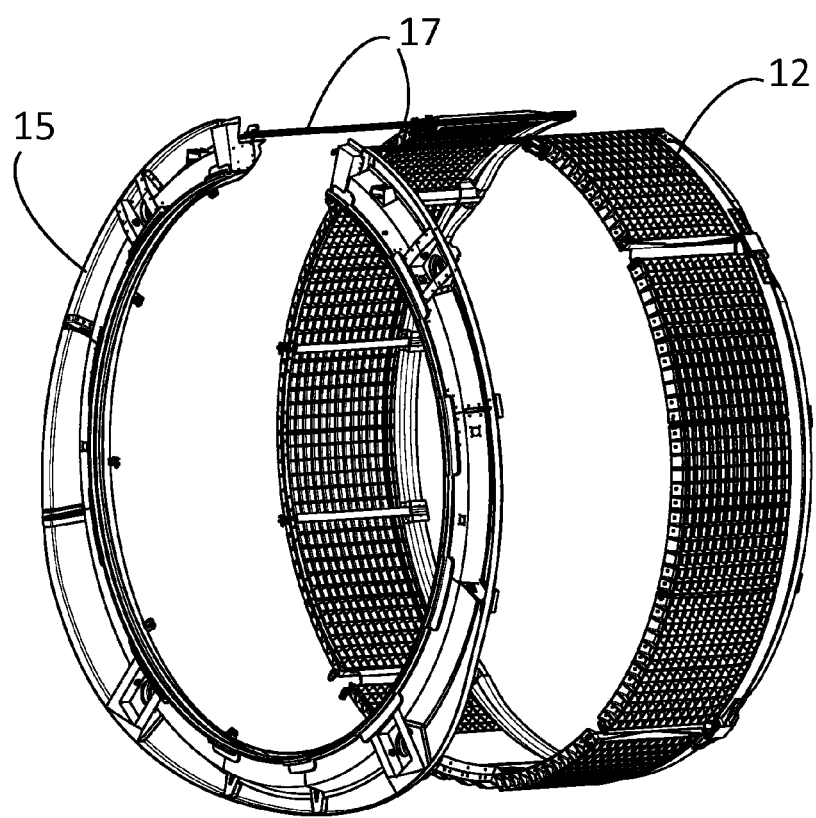
FIG. 7 is a perspective view of cascade vanes and a front frame structure illustrating cascade vanes detachably mounted on the front frame and translating independently therefrom.

This centering means may be positioned on neighboring structures, stationary or movable, and may assume the form, for example, of centering ramps, centering pins (18, see FIG. 6) capable of cooperating with corresponding openings (19) supported by the other structure, inter alia.

The movable inverter assembly (front frame 15 and vanes 12) is preferably kept substantially centered inside the movable cowl 11 during the movement into the supporting position. In fact, a mechanical connection as previously mentioned makes it possible to ensure substantially concentric centering of the two movable structures.

The removal of these assemblies is therefore made easier. Likewise, the assembly of the two structures will remain a single unit and is easier to store.

In the event this centering is ensured, the rail can be shortened and only concern an overlapping part of the guideway 17 in the active position.

To add reassembly reliability, the guide means may be equipped with centering ramps, preferably supported by the guideways 17 in the form of a beveled end.

In fact, preferably, the placement of the outer cowl 11 is done in its guide rails before the front frame inverter structure 15 and vanes 11 are introduced into their rails. Decentering of the rails 17 may therefore occur. The centering ramps make it possible to present the guideways 17 without constraints.

Although the invention has been described with one particular embodiment, it is of course in no way limited thereto and encompasses all technical equivalents of the means described as well as combinations thereof if they are within the scope of the invention.

The invention claimed is:

1. A thrust inverter for a turbojet engine nacelle including:
   at least one outer movable cowl that is movable between a closed position of the thrust inverter and a thrust inversion position, said at least one outer movable cowl also being able to be opened into a supporting position towards which said at least one outer movable cowl is hinged and guided through use of at least one guiding member that is suitable to said outer movable cowl and located substantially on a pylon, to which the nacelle is attached; and
   at least one front frame capable of being mounted downstream from an air blower housing for a turbojet engine and directly or indirectly holds at least one flow diversion means comprising cascade vanes, wherein at least one part of the front frame is detachably connected to the air blower housing and the front frame is translatable along said at least one guiding member once said front frame is detached from the air blower housing, wherein the cascade vanes are detachably mounted on the front frame and translate independently therefrom, at least one of the cascade vanes and the front frame configured to move to a maintenance position so as to provide access to the inside of the turbojet engine nacelle.

2. The thrust inverter according to claim 1, wherein the entire front frame is detachably and translatably mounted.

3. The thrust inverter according to claim 2, wherein the entire detachably mounted and movable front frame forms a single-unit assembly.

4. The thrust inverter according to claim 1, wherein the front frame is mounted downstream of the air blower housing by a male/female system of a blade/groove type.

5. The thrust inverter according to claim 1, wherein at least one section of front frame and of the diversion means form a single-unit assembly translatable when the front frame is detached from the air blower housing.

6. The thrust inverter according to claim 1, wherein said at least one guiding member comprises a rail/guideway system.

7. The thrust inverter according to claim 1, wherein at least part of said at least one guiding member is situated close to a connecting interface with a pylon to which the nacelle is attached.

8. The thrust inverter according to claim 7, wherein at least part of said at least one guiding member cooperates with complementary guide means fixed directly or indirectly in said pylon.

9. The thrust inverter according to claim 1, wherein said at least one outer movable cowl is translatably mounted along a substantially longitudinal axis of the nacelle and is equipped with temporary connecting means with the front frame and/or the diversion means, so as to translate said at least one outer movable cowl, frame and/or diversion means assembly during a maintenance operation once the front frame and/or the diversion means have been detached from the air blower housing.

10. The thrust inverter according to claim 1, wherein at least part of the movable elements comprising the front frame, diversion means, and said at least one outer movable cowl, are associated with centering means relative to another movable element, and/or a stationary structure of the thrust inverter.

* * * * *